US012789260B2

(12) United States Patent
Imai et al.

(10) Patent No.: US 12,789,260 B2
(45) Date of Patent: Nov. 10, 2026

(54) CUTTING METHOD

(71) Applicant: MITSUBISHI MATERIALS CORPORATION, Tokyo (JP)

(72) Inventors: Yasuharu Imai, Tokyo (JP); Hidebumi Takahashi, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 587 days.

(21) Appl. No.: 18/279,076

(22) PCT Filed: Mar. 11, 2022

(86) PCT No.: PCT/JP2022/010935
§ 371 (c)(1),
(2) Date: Aug. 28, 2023

(87) PCT Pub. No.: WO2022/202404
PCT Pub. Date: Sep. 29, 2022

(65) Prior Publication Data

US 2024/0139824 A1 May 2, 2024

(30) Foreign Application Priority Data

Mar. 26, 2021 (JP) ................................ 2021-052635

(51) Int. Cl.
*B23B 25/06* (2006.01)
*B23Q 17/20* (2006.01)
(Continued)

(52) U.S. Cl.
CPC .............. *B23B 25/06* (2013.01); *B23Q 17/20* (2013.01); *G05B 19/401* (2013.01); *G01B 7/023* (2013.01)

(58) Field of Classification Search
None
See application file for complete search history.

(56) References Cited

U.S. PATENT DOCUMENTS 4,428,055 A 1/1984 Zurbrick et al.
2016/0187867 A1* 6/2016 Hasty .................. G05B 19/401 700/192

FOREIGN PATENT DOCUMENTS

DE 102017129221 A1 7/2018
EP 0072687 B1 11/1986
(Continued)

OTHER PUBLICATIONS

Supplementary European Search Report mailed Feb. 14, 2025, issued for EP22775196.3.
(Continued)

*Primary Examiner* — Mohammad Ali
*Assistant Examiner* — Saad M Kabir
(74) *Attorney, Agent, or Firm* — Troutman Pepper Locke LLP

(57) ABSTRACT

This method is a machining method using a tool body (10, 110) to which a distance sensor (31, 32) is attached, the method including a coordinate setting step of setting each of a cutting edge coordinate with a point of a cutting edge (22, 122) provided at the tool body (10, 110) as reference and a sensor coordinate with a reference point of the distance sensor (31, 32) as reference, a machining step of forming a machined surface using the cutting edge coordinate, and a measurement step of measuring a dimension of the machined surface using the sensor coordinate.

8 Claims, 9 Drawing Sheets

(51) Int. Cl.
*G05B 19/401* (2006.01)
*G01B 7/02* (2006.01)

(56) References Cited

FOREIGN PATENT DOCUMENTS

| | | | |
|---|---|---|---|
| EP | 3686548 | A1 | 7/2020 |
| EP | 3744476 | A1 | 12/2020 |
| JP | 2001-030141 | A | 2/2001 |
| JP | 2010-188505 | A | 9/2010 |
| WO | 2019/151309 | A1 | 8/2019 |
| WO | 2020/151960 | A1 | 7/2020 |

OTHER PUBLICATIONS

International Search Report mailed May 31, 2022, issued for PCT/JP2022/010935 and English translation thereof.
Office Action mailed Jul. 29, 2025, issued for CN202280021930.8 and English translation of the Search Report.

* cited by examiner

CUTTING METHOD

TECHNICAL FIELD

The present invention relates to a cutting method.

Priority is claimed on Japanese Patent Application No. 2021-052635, filed Mar. 26, 2021, the content of which is incorporated herein by reference.

BACKGROUND ART

In recent years, a cutting tool with various functions has been developed. A cutting tool including an optical distance sensor is disclosed in Patent Document 1. As the tool has the distance sensor, dimension measurement of an object to be machined can be performed during a step, and efficient machining can be performed by shortening a time required for the measurement.

CITATION LIST

Patent Document

Patent Document 1
PCT International Publication No. WO2020/151960

SUMMARY OF INVENTION

Technical Problem

In the cutting tool, a point of a cutting edge is gradually abraded in accordance with a machining time. For this reason, when coordinates with the cutting edge as reference are reset after the cutting edge has been abraded, there is a possibility in which a measured value of the distance sensor is affected.

In view of such circumstances, one of objectives of the present invention is to provide a cutting method using a cutting tool that has a distance sensor, the cutting method being capable of improving the accuracy of dimension measurement.

Solution to Problem

According to an aspect of the present invention, there is provided a cutting method that is a machining method using a tool body to which a distance sensor is attached, the cutting method including a coordinate setting step of setting each of a cutting edge coordinate with a point of a cutting edge provided at the tool body as reference and a sensor coordinate with a reference point of the distance sensor as reference, a machining step of forming a machined surface using the cutting edge coordinate, and a measurement step of measuring a dimension of the machined surface using the sensor coordinate.

With the configuration described above, the machined surface that is machined using the cutting edge can be measured by the distance sensor. For this reason, after the turning tool forms the machined surface, when the machined surface is measured, it is not necessary to perform a step of temporarily separating the turning tool from a workpiece. As a result, a time required for the measurement step during turning machining can be shortened.

Further, with the configuration described above, since the cutting edge coordinate and the sensor coordinate can be individually set, a dimension measurement result is unlikely to be affected by attachment accuracy of the cutting edge and the distance sensor. In addition, since measurement accuracy of the distance sensor is unlikely to be affected by relative positions of the point of the cutting edge and the distance sensor, highly accurate dimension measurement can be performed even in a case where the cutting edge has been abraded.

In the cutting method described above, a comparison step of calculating a difference by comparing a target dimension of the machined surface in the machining step with a measured dimension measured in the measurement step and an additional machining step of performing additional machining of the machined surface in accordance with the difference may be further included.

With the configuration described above, dimensional accuracy of the machined surface can be improved by performing the additional machining step by bringing the turning tool closer to a workpiece side from a target position, based on the difference in the comparison step. In addition, the measurement step performed between the machining step and the additional machining step is performed using the distance sensor attached to the tool body. For this reason, a tact time from the machining step to the additional machining step can be shortened.

In the cutting method described above, a plurality of the distance sensors having different measurement directions may be attached to the tool body, and the sensor coordinate may be set for each of the distance sensors in the coordinate setting step.

With the configuration described above, by using the plurality of distance sensors having different measurement directions, dimension measurement of a plurality of places can be performed without changing a direction of the workpiece in the measurement step, and a time required for the measurement step can be further shortened. Further, the sensor coordinate is set for each distance sensor in the coordinate setting step. For this reason, compared to a case where one sensor coordinate is set with respect to the plurality of distance sensors, measurement results of the distance sensors are unlikely to be affected by the attachment accuracy of each distance sensor, and highly accurate dimension measurement can be performed.

In the cutting method described above, the coordinate setting step may be performed by bringing the point of the cutting edge and a tip surface of the distance sensor in contact with each other using a contact sensor.

With the configuration described above, by using the contact sensor in the coordinate setting step, it is easy to reliably obtain location information of the distance sensor without being affected by a usage environment or the like. In addition, by using the contact sensor, location information of the point of the cutting edge and the tip surface of the distance sensor can be obtained using a single sensor. For this reason, a time required for the coordinate setting step can be saved.

In the cutting method described above, the distance sensor may be an eddy current sensor, a calibration step of calibrating the eddy current sensor may be further included, the calibration step may include a reference value measurement step of performing dimension measurement of a reference machined surface, which is machined by the cutting edge, using a measuring instrument, an output value measurement step of measuring a plurality of measurement points where a distance from the reference machined surface is changed using the distance sensor with the sensor coordinate as reference and storing an output value of the distance sensor corresponding to each of the measurement points, and a calculation step of calculating a calibration formula representing a relationship between a distance to the reference machined surface in each of the measurement points and the output value, and in the measurement step, the dimension of the machined surface may be calculated by substituting the output value of the distance sensor into the calibration formula.

With the configuration described above, since the eddy current sensor is used as the distance sensor, accurate measurement can be performed even in a case where wet machining is performed. However, in a case where the eddy current sensor is used, since output value of the sensor changes depending on a material for a machining target, calibration is necessary. With the configuration described above, since the calibration is performed using the reference machined surface formed by the cutting edge, a calibration jig or the like is not necessary. Moreover, since calibration can be performed using an object to be machined, compared to a case where a jig or the like is used, not only a more accurate calibration formula can be calculated, but also a time required for attaching and detaching the jig can be saved.

In the cutting method described above, in a case where x is the output value of the distance sensor, y is the distance to the machined surface, and a, b, c, d, and e are constants, the calibration formula may be expressed by the following equation $$y=ax^4+bx^3+cx^2+dx+e.$$

With the configuration described above, accurate measurement can be performed with respect to various materials.

In the cutting method described above, in the calculation step, in a case where a material for a machining target is an iron-based material, 0 may be substituted in advance for the constants a, b, and c.

With the configuration described above, the number of measurement points where measurement is performed in the calibration step can be reduced in a case where the machining target is an iron-based material. Accordingly, a time required for the calibration step can be shortened while maintaining calibration accuracy.

In the cutting method described above, the tool body may be provided with a communication unit that transmits measurement data measured by the distance sensor to an external control device, and the control device may perform the calculation step and store the calculated calibration formula.

With the configuration described above, data of the calibration formula can be accumulated and analyzed in the control device.

In the cutting method described above, the machining step may be performed while a cutting oil or a coolant is supplied to the machined surface.

With the configuration described above, since the eddy current sensor is used, accuracy of dimension measurement in the measurement step can be ensured even in a case where wet machining is adopted in the machining step.

Advantageous Effects of Invention

In the present invention, the accuracy of dimension measurement can be improved in the cutting method using the cutting tool that has the distance sensor.

DESCRIPTION OF EMBODIMENTS

Hereinafter, a turning tool (cutting tool) 1 according to an embodiment of the present invention will be described with reference to the drawings. In the following drawings, in order to facilitate understanding of each configuration, a scale and the number of all structures may be different from those of an actual structure.

First Embodiment

<Turning Tool>

Figure 1:
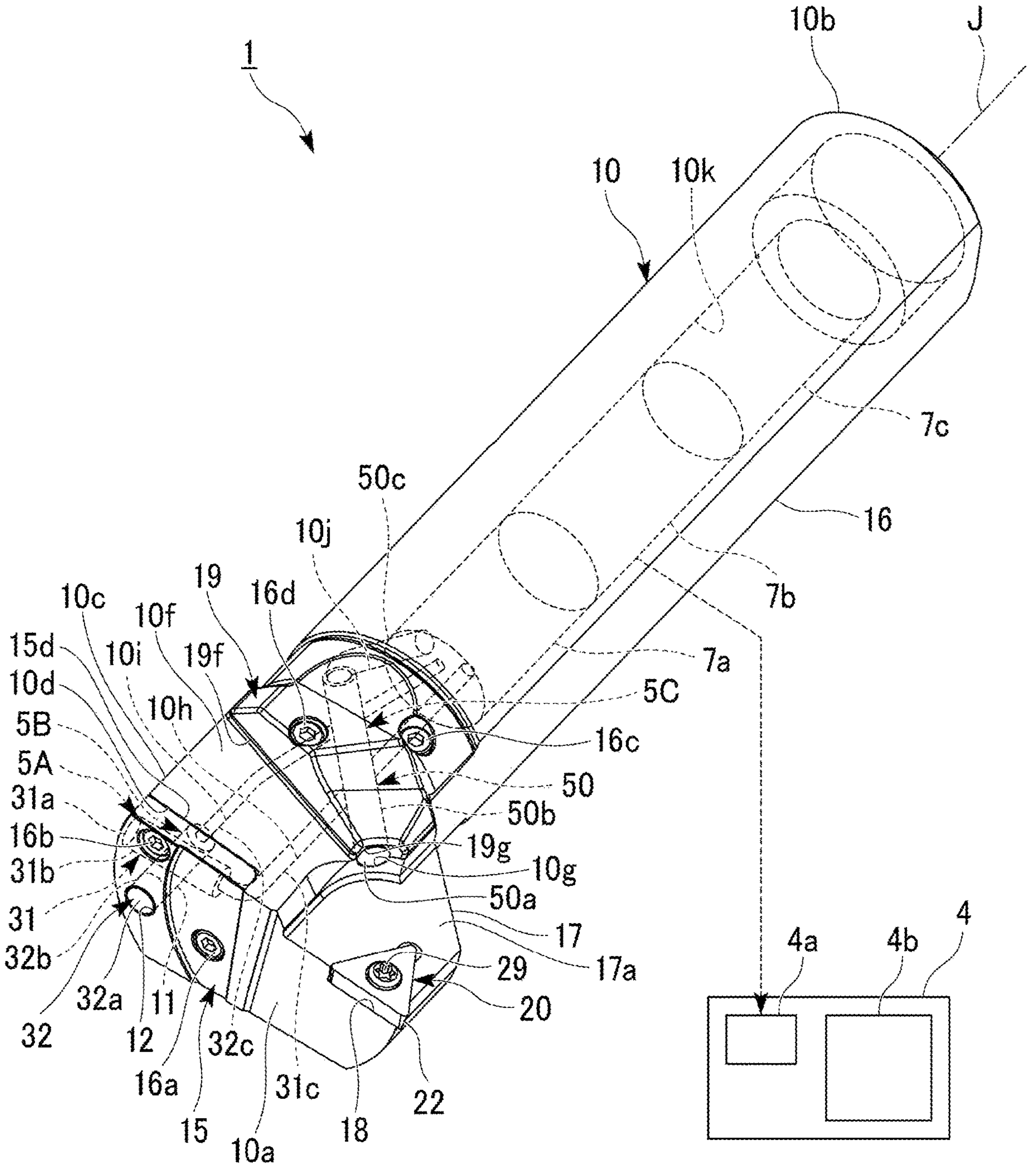
FIG. 1 is a perspective view of a turning tool (cutting tool) of a first embodiment.
Figure 2:
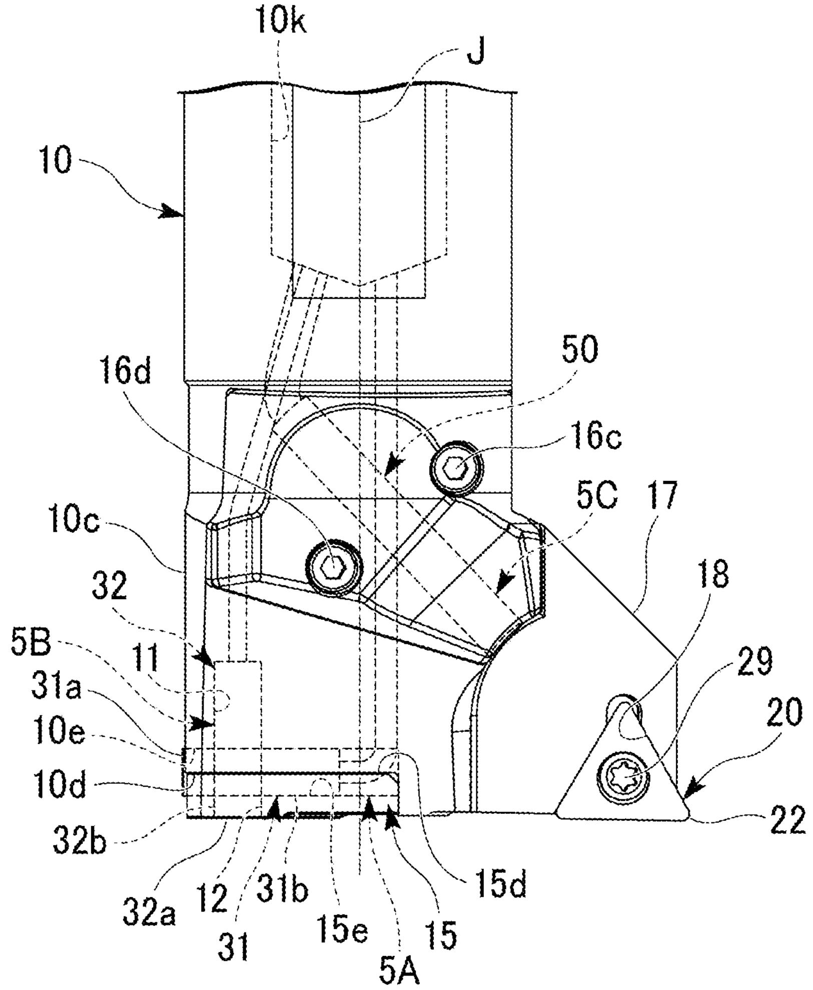
FIG. 2 is a plan view of the turning tool of the first embodiment.
Figure 3:
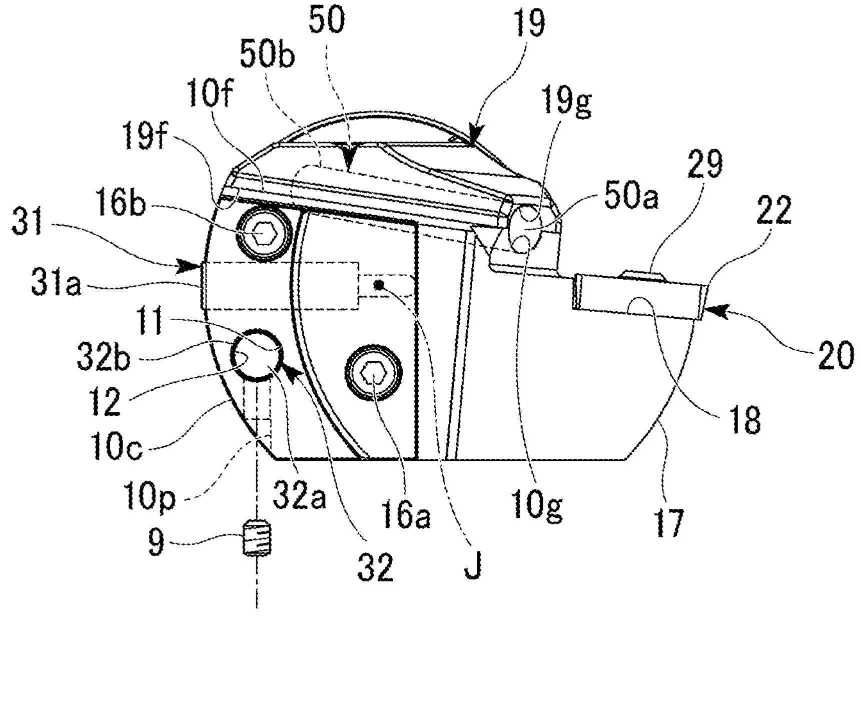
FIG. 3 is a front view of the turning tool of the first embodiment.

FIG. 1 is a perspective view of the turning tool 1 according to a first embodiment. FIG. 2 is a plan view of the turning tool 1. FIG. 3 is a front view of the turning tool 1.

The turning tool 1 of the present embodiment performs turning machining such as boring on a workpiece such as a metal material rotated around a main axis. A posterior end part of the turning tool 1 is detachably held by a jig (cutter holder) (not shown). In addition, the jig which holds the turning tool 1 is fixed to a machine tool (lathe) such as a lathe (not shown).

As shown in FIG. 1, the turning tool 1 includes a tool body 10, a first bracket 15, a second bracket 19, a cutting insert 20, a first distance sensor (distance sensor) 31, a second distance sensor (distance sensor) 32, and an imaging device 50. The first bracket 15, the second bracket 19, the cutting insert 20, the first distance sensor 31, the second distance sensor 32, and the imaging device 50 are attached to the tool body 10.

The tool body 10 is a rod body that extends in a shaft shape. Herein, a tool axis J is set along an extending direction of the tool body 10. That is, the tool body 10 extends along the tool axis J.

In the following description, unless otherwise specified, a direction parallel to the tool axis J will be simply referred to as an "axial direction", and a radial direction around the tool axis J will be simply referred to as a "radial direction".

The tool body 10 is formed of a metal material such as steel. The tool body 10 has a cylindrical shank part 16 around the tool axis J and a protruding part 17 that protrudes from an outer circumferential surface of the shank part 16 at a tip part 10*a* of the tool body to a radially outer side of the tool axis J.

A hollow hole 10*k* that opens to a posterior end part 10*b* side is provided in the shank part 16. A sensing module 7*a*, a wireless communication module (communication unit) 7*b*, and a power supply module 7*c* are accommodated in the hollow hole 10*k*. That is, the turning tool 1 includes the sensing module 7*a*, the wireless communication module 7*b*, and the power supply module 7*c*.

The sensing module 7*a* controls the first distance sensor 31, the second distance sensor 32, and the imaging device 50. The wireless communication module 7*b* transmits measurement data that is measured by the first distance sensor 31, the second distance sensor 32, and the imaging device 50 and that is collected by the sensing module 7*a* to an external receiving device 4*a*. The receiving device 4*a* is provided at a control device 4 that controls the turning tool 1. The control device 4 may control the machine tool (not shown). The control device 4 is provided with a storage unit 4*b*. The storage unit 4*b* stores the measurement data of the first distance sensor 31, the second distance sensor 32, and the imaging device 50, a calibration formula to be described later, and the like.

The power supply module 7*c* supplies power to the first distance sensor 31, the second distance sensor 32, the imaging device 50, the sensing module 7*a*, and the wireless communication module 7*b*. The power supply module 7*c* may charge a secondary battery such as a lithium-ion battery with electricity from a generator such as a piezo vibration sensor that performs generation with vibration generated by the tool body 10 during cutting, may charge such a secondary battery with electricity supplied from an external power supply in a contact or non-contact manner, or may be a primary battery such as a manganese dry battery and an alkaline dry battery.

The tip part 10*a* of the shank part 16 is provided with a tip surface (first holding surface) 10*d* and an upper surface (second holding surface) 10*f*. That is, the tool body 10 has the tip surface 10*d* and the upper surface 10*f*. The tip surface 10*d* is a flat surface that is located at the tip part 10*a* of the tool body 10 and that faces a tip side. In addition, the upper surface 10*f* is a flat surface formed by cutting the tip part 10*a* of the shank part 16. The upper surface 10*f* is a surface parallel to a protruding direction of the protruding part 17 and the tool axis J. The tip surface 10*d* and the upper surface 10*f* are orthogonal to each other.

In the following description, each part of the turning tool 1 will be described with a direction in which the upper surface 10*f* faces as an upper side. However, a posture of the turning tool 1 during use is not limited to the direction.

The protruding part 17 has a protruding upper surface 17*a* that faces the upper side. The protruding upper surface 17*a* extends parallel to the protruding direction of the protruding part 17 and the tool axis J. The protruding upper surface 17*a* is a surface parallel to the upper surface 10*f*. The protruding upper surface 17*a* is provided with a pedestal 18 to which the cutting insert 20 is attached. The pedestal 18 is located at a corner part on the tip side in the protruding direction of the protruding part 17 and on the tip side of the tool body 10. That is, the tool body 10 has the pedestal 18 at the tip part 10*a*. The pedestal 18 has a concave shape recessed to a lower side and an opposite side to the protruding direction of the protruding part 17.

The cutting insert 20 is detachably attached to the pedestal 18 by using a fixing screw 29. The cutting insert 20 of the present embodiment has a triangular prism shape such as an equilateral triangle when viewed from a thickness direction. The cutting insert has a pair of main surfaces that face the thickness direction and that have a triangular shape in plan view and a side surface that connects the pair of main surfaces to each other. A cutting edge 22 is provided at each ridge between the main surfaces and the side surface of the cutting insert 20. A shape of the cutting insert 20 is not limited to the present embodiment.

As shown in FIG. 2, the cutting edge 22 protrudes to the tip side of the tool body 10. In addition, the cutting edge 22 protrudes to the radially outer side. Therefore, a part of the cutting edge 22 is located at an axial forefront and a radial outermost end of the turning tool 1.

As shown in FIG. 1, the first bracket 15 is fixed to the tip surface 10*d* of the tool body 10 by two fixing screws 16*a* and 16*b*. The first bracket 15 has a plate shape along a plane orthogonal to the tool axis J. The first bracket 15 has a facing surface 15*d* that faces the posterior end part 10*b* side of the tool body 10. The facing surface 15*d* faces and is in contact with the tip surface 10*d* of the tool body 10.

As shown in FIG. 2, a first concave groove 10*e* is provided in the tip surface 10*d* of the tool body 10. The first concave groove 10*e* extends from an outer circumferential surface 10*c* of the tool body 10 toward the tool axis J in the radial direction. Similarly, a second concave groove 15*e* that overlaps the first concave groove 10*e* when viewed from a tool axis J direction is provided in the facing surface 15*d* of the first bracket 15.

A sectional shape of the first concave groove 10*e* is a semicircular shape. Similarly, also a sectional shape of the second concave groove 15*e* is a semicircular shape. The first concave groove 10*e* and the second concave groove 15*e* overlap each other and form a circular first hole part 5A that extends along the radial direction of the tool axis J. The first hole part 5A opens toward the radially outer side of the tool axis J, which is an opposite side to the cutting insert 20. A sensor head 31*b* of the first distance sensor 31 is disposed in the first hole part 5A.

A first accommodation hole 11 that extends along the axial direction is provided in the tool body 10. The first accommodation hole 11 is a circular hole. The first accommodation hole 11 opens to the tip surface 10*d*. A through hole 12 that penetrates in the thickness direction is provided in the first bracket 15. The through hole 12 of the first bracket 15 overlaps an opening of the first accommodation hole 11. The first accommodation hole 11 and the through hole 12 are connected to each other and form a circular second hole part 5B. The second hole part 5B opens to the tip side of the tool body 10. An opening of the second hole part 5B is located on the opposite side to the cutting insert 20 across the tool axis J. A sensor head 32*b* of the second distance sensor 32 is disposed in the second hole part 5B.

As shown in FIG. 1, the second bracket 19 is fixed to the upper surface 10*f* of the tool body 10 by two fixing screws 16*c* and 16*d*. A lower surface 19*f* of the second bracket 19 faces and is in contact with the upper surface 10*f* of the tool body 10.

A third concave groove 10*g* is provided in the upper surface 10*f* of the tool body 10. The third concave groove 10*g* extends from a protruding upper surface 17*a* side of the protruding part 17 toward a posterior end side of the tool body 10. In addition, a fourth concave groove 19*g* that overlaps the third concave groove 10*g* when viewed from the upper side is provided in the lower surface 19*f* of the second bracket 19.

A sectional shape of the third concave groove 10*g* is a semicircular shape. Similarly, also a sectional shape of the fourth concave groove 19*g* is a semicircular shape. The third concave groove 10*g* and the fourth concave groove 19*g* overlap each other and form a circular third hole part 5C that extends along the radial direction of the tool axis J. The cutting edge 22 of the cutting insert 20 is disposed on an extension line of the third hole part 5C. A camera main body part 50*b* of the imaging device 50 is disposed in the third hole part 5C.

Linking holes 10*h*, 10*i*, and 10*j* that allow the first hole part 5A, the second hole part 5B, and the third hole part 5C to communicate with the hollow hole 10*k* are provided in the tool body 10. A cable 31*c* of the first distance sensor 31 passes through the linking hole 10*h*, a cable 32*c* of the second distance sensor 32 passes through the linking hole 10*i*, and a cable 50*c* of the imaging device 50 passes through the linking hole 10*j*. The cables 31*c*, 32*c*, and 50*c* are connected to the sensing module 7*a* disposed in the hollow hole 10*k*.

The first distance sensor 31 and the second distance sensor 32 measure a distance to an object (a machined surface formed by the cutting insert). In the present embodiment, the first distance sensor 31 and the second distance sensor 32 are eddy current sensors.

The first distance sensor 31 and the second distance sensor 32 have the cylindrical sensor heads 31*b* and 32*b* and the cables 31*c* and 32*c* that extend from posterior ends of the sensor heads 31*b* and 32*b*.

The first distance sensor 31 allows a tip surface 31*a* of the sensor head 31*b* to face a measurement target, and the second distance sensor 32 allows a tip surface 32*a* of the sensor head 32*b* to face a measurement target. The first distance sensor 31 and the second distance sensor 32 generate high-frequency magnetic fields by flowing high-frequency magnetic currents inside the sensor heads 31*b* and 32*b*. Accordingly, an eddy current flows to a surface of an object to be measured that is a conductor, and impedance of each of coils inside the sensor heads 31*b* and 32*b* changes. The first distance sensor 31 and the second distance sensor 32 determine a distance to the measurement target from the change of the impedance. The first distance sensor 31 and the second distance sensor 32 output the change of the impedance as a voltage (the unit is V). Output values of the first distance sensor 31 and the second distance sensor 32 are converted into the distance to the measurement target using the calibration formula calculated in advance.

The tip surface 31*a* of the first distance sensor 31 is disposed from the outer circumferential surface 10*c* of the tool body 10 toward the radially outer side of the tool axis J. The first distance sensor 31 measures a distance to the object to be measured disposed on the radially outer side of the tool body 10. That is, the first distance sensor 31 takes the radially outer side of the tool axis J as a measurement direction.

The sensor head 31*b* of the first distance sensor 31 is sandwiched and held between the tip surface 10*d* of the tool body 10 and the first bracket 15. For this reason, the sensor head 31*b* is held with respect to the tool body 10 and the first bracket 15 in a wide range in a length direction thereof. Therefore, the sensor head 31*b* of the first distance sensor 31 is unlikely to be displaced in response to vibration or the like, and accuracy of dimension measurement by the first distance sensor 31 can be stabilized.

In the present embodiment, the first concave groove 10*e* that accommodates the sensor head 31*b* is provided in the tip surface 10*d* of the tool body 10, and the second concave groove 15*e* that accommodates the sensor head 31*b* is provided in the facing surface 15*d* of the first bracket 15. Inner circumferential surfaces of the first concave groove 10*e* and the second concave groove 15*e* curve in a semicircular shape along the outer circumferential surface of the sensor head 31*b*. The inner circumferential surfaces of the first concave groove 10*e* and the second concave groove 15*e* are in surface-contact with the outer circumferential surface of the sensor head 31*b*. Accordingly, a large contact area of the outer circumferential surface of the sensor head 31*b* with respect to the tool body 10 and the first bracket 15 can be ensured, and displacement of the first distance sensor 31 can be more reliably suppressed.

In the present embodiment, the sensor head 31*b* of the first distance sensor 31 is covered with the first bracket 15. For this reason, only the tip surface 32*a* of the sensor head 31*b* is exposed to the outside, and the other parts are protected. In the present embodiment, the sensor head 31*b* is protected by the first bracket 15 against scattering of chips during a machining step.

The tip surface 32*a* of the second distance sensor 32 is disposed from the tip surface 10*d* of the tool body 10 toward the tip side of the tool axis J. The second distance sensor 32 measures a distance to the object to be measured disposed on the tip side of the tool body 10. That is, the second distance sensor 32 takes the tip side of the tool axis J as a measurement direction.

The second distance sensor 32 is accommodated in the first accommodation hole 11 of the tool body 10. That is, the sensor head 31*b* of the second distance sensor 32 is disposed inside the tool body 10. For this reason, only the tip surface 32*a* of the sensor head 32*b* is exposed to the outside, and the other parts are protected. That is, the second distance sensor 32 is protected by the tool body 10, and collision with chips or the like is suppressed.

As shown in FIG. 3, a screw hole 10*p* that extends from the outer circumferential surface 10*c* to the first accommodation hole 11 is provided in the tool body 10. A set screw 9 is inserted into the screw hole 10*p*. The second distance sensor 32 is pushed against an inner circumferential surface of the first accommodation hole 11 by the set screw 9. Accordingly, the second distance sensor 32 is fixed to the tool body 10. Accordingly, the second distance sensor 32 can be stably fixed.

In the present embodiment, as shown in FIG. 1, not only the cutting insert 20 but also the first distance sensor 31 and the second distance sensor 32 are attached to the tool body 10. For this reason, a machined surface that is machined using the cutting insert 20 can be measured by the first distance sensor 31 and the second distance sensor 32. Therefore, when the machined surface is measured after the turning tool 1 forms the machined surface, it is not necessary to perform a step of temporarily separating the turning tool 1 from a workpiece. As a result, a time required for the measurement step during turning machining can be shortened.

In the present embodiment, since the eddy current sensors are used as the first distance sensor 31 and the second distance sensor 32, accurate measurement can be performed even in a case where wet machining is performed. The eddy current sensors are likely to have stable measurement accuracy with respect to disturbances such as the surrounding environment. For this reason, regardless of selecting any one of wet machining and dry machining, the eddy current sensors are suitable for distance measurement in an environment with many disturbances after cutting compared to an optical distance sensor and the like.

In the present embodiment, a distance to a machined surface that is machined by the cutting insert 20 and that faces the radial direction can be measured using the first distance sensor 31, and a distance to a machined surface that is machined by the cutting insert 20 and that faces the axial direction can be measured using the second distance sensor 32. That is, during dimension measurement, dimension measurement of surfaces facing different directions can be performed without changing the direction of the workpiece, and a time required for the measurement step can be further shortened. The first distance sensor 31 can measure an outer diameter, an inner diameter, circularity, and the like, which are machined by the cutting insert 20. In addition, the second distance sensor can measure axial direction positions or the like of a stepped part and a hole bottom part at the cutting insert.

The imaging device 50 is a camera made of a cylindrical waterproof CMOS image sensor and a CCD image sensor. The imaging device 50 has the cylindrical camera main body part 50*b* and a cable 50*c* that extends from a posterior end of the camera main body part 50*b*. The camera main body part 50*b* has a lens surface 50*a* that faces an imaging target. In addition, a plurality of LED lights that illuminate the imaging target may be arranged in the surroundings of the lens surface 50*a*.

The lens surface 50*a* of the imaging device 50 is directed toward the cutting edge 22 (in particular, a corner edge) of the cutting insert 20. Accordingly, the imaging device 50 images the cutting edge 22 and also images a machined surface of a workpiece on which cutting is performed by the cutting edge 22.

The camera main body part 50*b* of the imaging device 50 is sandwiched and held between the upper surface 10*f* of the tool body 10 and the second bracket 19. For this reason, the camera main body part 50*b* is held with respect to the tool body 10 and the second bracket 19 in a wide range in a length direction thereof. Therefore, the camera main body part 50*b* of the imaging device 50 is unlikely to be displaced in response to vibration or the like, and the accuracy of dimension measurement by the imaging device 50 can be stabilized.

In the present embodiment, the third concave groove 10*g* 19*g* that accommodates the camera main body part 50*b* is provided in the upper surface 10*f* of the tool body 10, and the fourth concave groove 19*g* that accommodates the camera main body part 50*b* is provided in the lower surface 19*f* of the second bracket 19. Inner circumferential surfaces of the third concave groove 10*g* and the fourth concave groove 19*g* curve in a semicircular shape along an outer circumferential surface of the camera main body part 50*b*. The inner circumferential surfaces of the third concave groove 10*g* and the fourth concave groove 19*g* are in surface-contact with the outer circumferential surface of the camera main body part 50*b*. Accordingly, a large contact area of the outer circumferential surface of the camera main body part 50*b* with respect to the tool body 10 and the second bracket 19 can be ensured, and displacement of the imaging device 50 can be more reliably suppressed. In the present embodiment, the camera main body part 50*b* of the imaging device 50 is covered with the second bracket 19. For this reason, only the lens surface 50*a* of the camera main body part 50*b* is exposed to the outside, and the other parts are protected. In the present embodiment, the camera main body part 50*b* is protected by the second bracket 19 against scattering of chips during the machining step.

In the present embodiment, since the imaging device 50 is attached to the tool body 10, an image of a machined surface of a workpiece or the like can be captured even when the machine tool does not include an imaging device. Accordingly, properties of the machined surface of the workpiece and a generation state of burrs generated at the machined surface or the like can be checked. In addition, in a case where the imaging device 50 images the cutting edge 22, a generation state of chips generated by the cutting edge 22 and damage such as fragmenting, chipping, and abrasion of the cutting edge can be checked.

<Cutting Method>

Next, a cutting method using the turning tool 1 according to the present embodiment will be described.

The cutting method using the turning tool 1 has a coordinate setting step and a calibration step that are preliminary steps, the machining step, and the measurement step.

<Coordinate Setting Step>

Figure 4A:
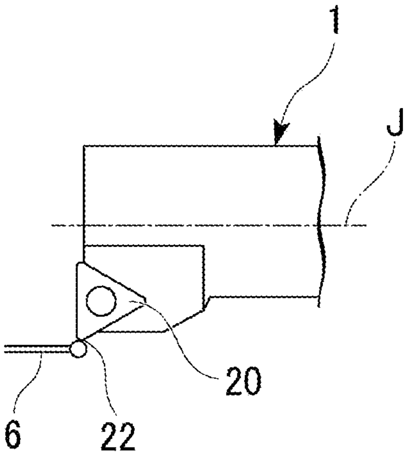
FIG. 4A is a schematic view showing coordinate setting of the first embodiment.
Figure 4B:
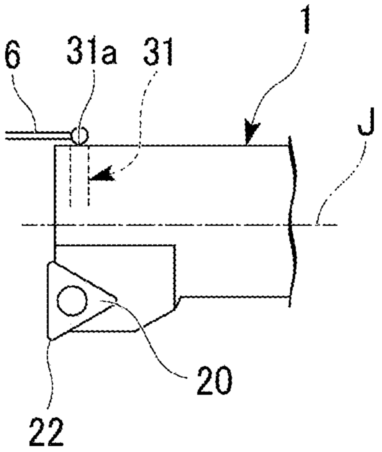
FIG. 4B is a schematic view showing the coordinate setting of the first embodiment.
Figure 4C:
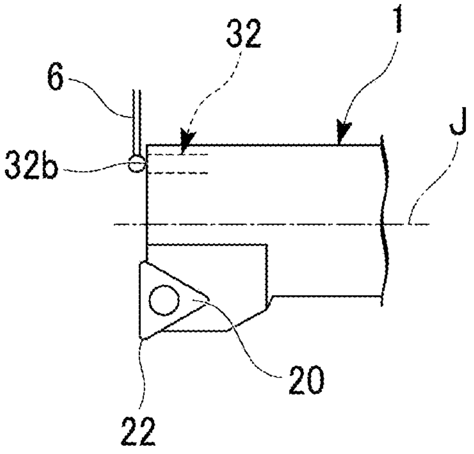
FIG. 4C is a schematic view showing the coordinate setting of the first embodiment.

FIGS. 4A to 4C are schematic views showing coordinate setting of the present embodiment.

The coordinate setting step has a step of setting cutting edge coordinates, a step of setting first sensor coordinates, and a step of setting second sensor coordinates. The coordinate setting step is performed using a contact sensor 6. The contact sensor 6 is, for example, a sensor such as a touch probe.

FIG. 4A shows the step of setting cutting edge coordinates. The cutting edge coordinates are coordinates with the point of the cutting edge 22 of the cutting insert 20 as reference. In the step, the point of the cutting edge 22 is brought into contact with the contact sensor 6, location information of the point of the cutting edge 22 is stored in the sensing module 7*a*, and the cutting edge coordinates are set.

FIG. 4B shows the step of setting first sensor coordinates. The first sensor coordinates are coordinates with the tip surface 31*a* of the first distance sensor 31 as reference. In the step, the tip surface 31*a* of the first distance sensor 31 is brought into contact with the contact sensor 6, location information of the tip surface 31*a* of the first distance sensor 31 is stored in the sensing module 7*a*, and the first sensor coordinates are set.

FIG. 4C shows the step of setting second sensor coordinates. The second sensor coordinates are coordinates with the tip surface 32*a* of the second distance sensor 32 as reference. In the step, the tip surface 32*a* of the second distance sensor 32 is brought into contact with the contact sensor 6, location information of the tip surface 32*a* of the second distance sensor 32 is stored in the sensing module 7*a*, and the second sensor coordinates are set.

In the present embodiment, the cutting edge coordinates and the sensor coordinates are set individually. For this reason, a dimension measurement result is unlikely to be affected by attachment accuracy of the cutting insert 20 and the distance sensors 31 and 32. In addition, since the measurement accuracy of the distance sensors 31 and 32 is unlikely to be affected by relative positions of the point of the cutting edge 22 and the distance sensors, highly accurate dimension measurement can be performed even in a case where the cutting edge 22 has been abraded.

In the present embodiment, the coordinate setting step is performed using the contact sensor. For this reason, it is easy to obtain location information of the cutting edge 22 and the distance sensors 31 and 32 without being affected by the surrounding environment when the setting step is performed. In addition, by using the contact sensor, location information of the point of the cutting edge 22 and the tip surfaces 31*a* and 32*a* of the distance sensors 31 and 32 can be obtained using a single sensor. For this reason, a time required for the coordinate setting step can be saved.

In the present embodiment, the sensor coordinates are set for each of the distance sensors 31 and 32. For this reason, compared to a case where one sensor coordinates are set with respect to the plurality of distance sensors 31 and 32, it can be suppressed that the measurement accuracy of the distance sensors 31 and 32 is affected by the attachment accuracy of each the distance sensors 31 and 32.

<Calibration Step>

FIGS. 5A to 5E are schematic views showing the calibration step of the present embodiment.

In the present embodiment, eddy current sensors are used as the distance sensors 31 and 32. Since the eddy current sensors have a changing relationship between an output value and a distance depending on a material for a measurement target, it is necessary to calculate a relationship between an output value and a distance for each material (calibration formula) in advance. The calibration step is a step of calculating the calibration formula with respect to a material for a workpiece W of the machining step to be described later. The calibration step of the present embodiment has a preliminary machining step, a reference value measurement step, an output value measurement step, and a calculation step.

Figure 5A:
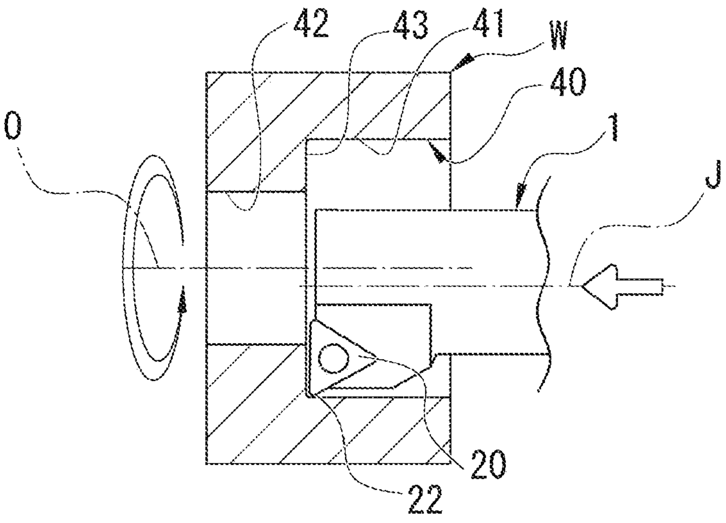
FIG. 5A is a view showing a preliminary machining step of the first embodiment.
Figure 5B:
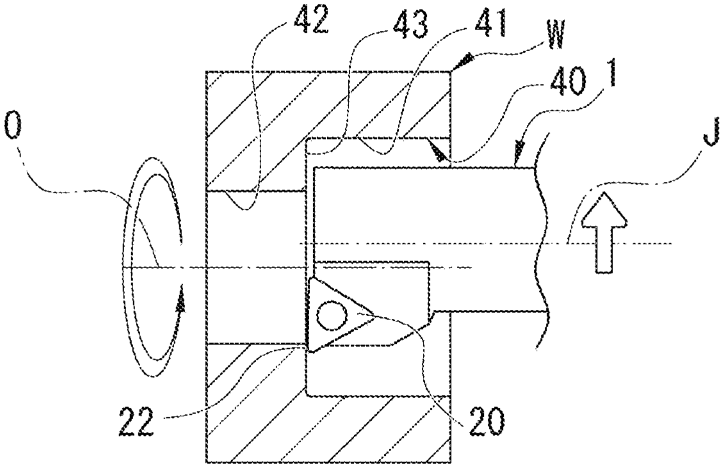
FIG. 5B is a view showing the preliminary machining step of the first embodiment.

FIGS. 5A and 5B are views showing the preliminary machining step. In the preliminary machining step, the workpiece W that is machined in the machining step is used as it is. In the preliminary machining step, machining is performed such that the tool is sufficiently offset with respect to a target dimension in the machining step and a cutting target is larger than the target dimension of the machining step.

The workpiece W of the present embodiment has a through hole 40 with a step. The through hole 40 has a stepped surface 43, a larger-diameter part 41 on one side in the axial direction with respect to the stepped surface 43, and a smaller-diameter part 42 on the other side in the axial direction with respect to the stepped surface 43. The cutting method of the present embodiment is a machining method for finishing inner circumferential surfaces of the larger-diameter part 41 and the stepped surface 43 of the through hole 40.

In the preliminary machining step, as shown in FIG. 5A, the inner circumferential surface of the larger-diameter part 41 is machined. In the step, the cutting edge 22 is brought into contact with the inner circumferential surface of the larger-diameter part 41 of the workpiece W while rotating the workpiece W around a main axis O and is moved in the axial direction. Further, in the preliminary machining step, as shown in FIG. 5B, the stepped surface 43 is machined. In the step, the cutting edge 22 is moved in the radial direction along the stepped surface while continuously rotating the workpiece W around the main axis O. Accordingly, in the preliminary machining step, a reference machined surface is formed.

Figure 5C:
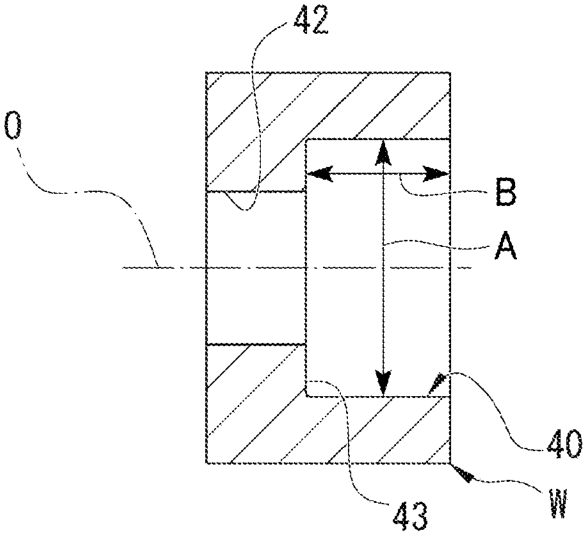
FIG. 5C is a view showing a reference value measurement step of the first embodiment.

FIG. 5C is a view showing the reference value measurement step. The reference value measurement step is a step of performing dimension measurement of the reference machined surface that is machined by the cutting edge 22 in a temporary machining step. More specifically, in the reference value measurement step, the inner diameter of the larger-diameter part 41 and the step dimension of the stepped surface 43 are measured with separately prepared measuring instruments A and B and are used as reference values when calibration is performed. The measuring instruments A and B are, for example, measuring devices such as a cylinder gauge and a depth gauge.

Figure 5D:
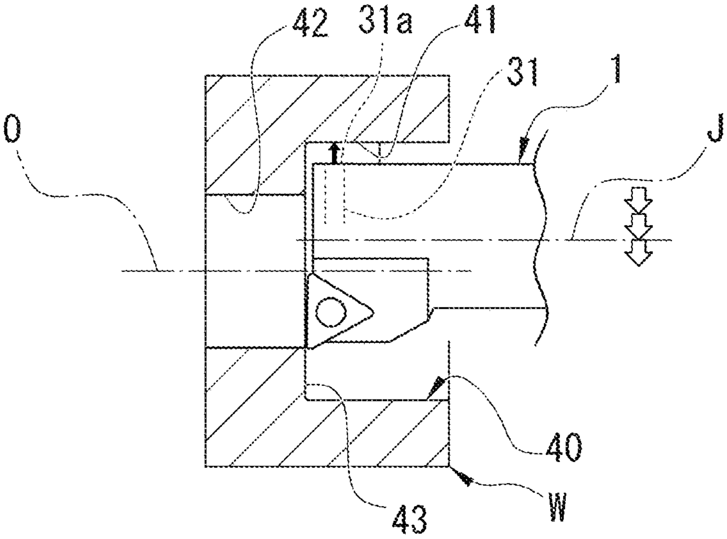
FIG. 5D is a view showing an output value measurement step of the first embodiment.
Figure 5E:
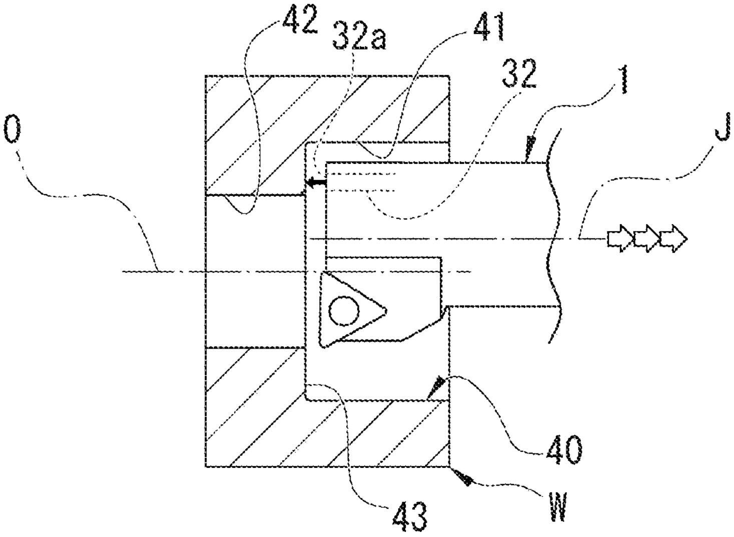
FIG. 5E is a view showing the output value measurement step of the first embodiment.

FIGS. 5D and 5E are views showing the output value measurement step. In the output value measurement step, an output value corresponding to each distance from the workpiece W is measured using the first distance sensor 31 and the second distance sensor 32 with the reference values measured in the reference value measurement step as reference.

FIG. 5D shows the output value measurement step of the first distance sensor 31.

In the output value measurement step, first, the tip surface 31*a* of the first distance sensor 31 is moved to a first measurement point where a distance from the inner circumferential surface of the larger-diameter part 41 is a first distance (for example, 0.1 mm) using the reference value measured in the reference value measurement step, and an output value from the first distance sensor 31 is stored.

Next, the tip surface 31*a* is moved to a second measurement point where a distance from the inner circumferential surface of the larger-diameter part 41 is a second distance (for example, 0.2 mm), and an output value from the first distance sensor 31 is stored. Further, the tip surface 31*a* is moved to third, fourth . . . measurement points, and an output value of the first distance sensor 31 corresponding to each measurement point is stored in the sensing module 7*a*. Alignment of the first distance sensor 31 in the step is performed using the first sensor coordinates.

FIG. 5E shows the output value measurement step of the second distance sensor 32.

In the output value measurement step of the second distance sensor 32, similar to the case of the first distance sensor 31 described above, first, the tip surface 32*a* of the second distance sensor 32 is moved to a first measurement point where a distance from the stepped surface 43 is a first distance (for example, 0.2 mm) using the reference value measured in the reference value measurement step, and an output value from the second distance sensor 32 is stored. Next, the tip surface 32*a* is moved to a second measurement point where a distance from the stepped surface 43 is a second distance (for example, 0.3 mm), and an output value from the second distance sensor 32 is stored. Further, third, fourth . . . measurement points and output values of the second distance sensor 32 corresponding to the measurement points are sequentially stored. Alignment of the second distance sensor 32 in the step is performed using the second sensor coordinates. As described above, in the output value measurement step, a plurality of measurement points where a distance from a reference machined surface is changed are measured using the distance sensors 31 and 32 with sensor coordinates as reference, and output values of the distance sensors 31 and 32 corresponding to the measurement points are stored. Data of a combination of a distance from a measurement target and an output value is transmitted to the control device 4 by the wireless communication module 7*b* and is stored in the storage unit 4*b* of the control device 4 (see FIG. 1).

In the calculation step, from a relationship between a distance from the reference machined surface at each measurement point, which is measured in the output value measurement step, and an output value, a calibration formula representing the relationship is calculated. The calculation step is performed for each of the distance sensors 31 and 32. That is, in the calculation step, a calibration formula corresponding to the first distance sensor 31 and a calibration formula corresponding to the second distance sensor 32 are derived. The calculation step is performed by the control device 4 (see FIG. 1). In addition, the calibration formulas derived through the calculation step are stored in the storage unit 4*b* of the control device 4. The control device 4 calibrates a measured value using the calibration formulas stored in the storage unit 4*b* and calculates an actual dimension. In the present embodiment, by transmitting the calibration formulas to the external control device 4, the control device 4 can perform accumulation and analysis. Accordingly, it is possible to change a cutting condition based on an analysis result or to suggest replacement of the cutting tool, the cutting insert 20, and the like.

The calibration formulas convert voltages (the unit is V) that are the output values of the distance sensors 31 and 32 into distances from the tip surfaces 31*a* and 31*b* of the distance sensors 31 and 32 to a measurement target (the unit is mm). The calibration formulas are expressed by the following equation assuming that x is the output values of the distance sensors 31 and 32, y is a distance to a machined surface, and a, b, c, d, and e are constants. That is, the calibration formulas are expressed by a function of fourth order or less.

$$y=ax^4+bx^3+cx^2+dx+e$$

Figure 6:
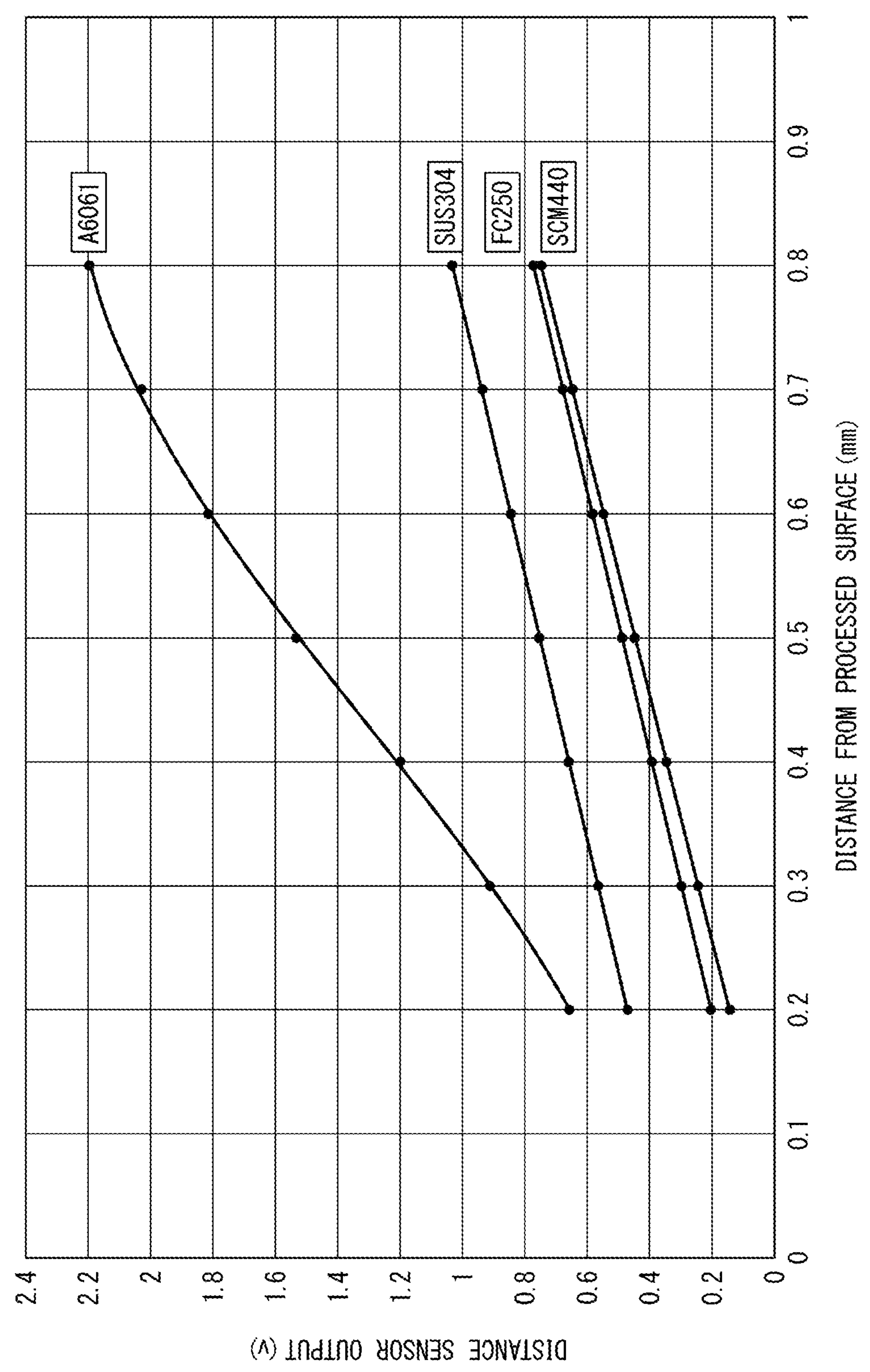
FIG. 6 is a graph representing calibration formulas with respect to workpieces W made of various materials.

FIG. 6 is a graph representing a calibration formula with respect to the workpiece W made of various materials. FIG. 6 shows a graph of a calibration formula in a case where an aluminum alloy (A6061) and iron-based alloys (SUS304, FC250, SCM440) are selected as the workpiece W.

In addition, in the graph of FIG. 6, a distance from a machined surface is measured with seven points including 0.2 mm, 0.3 mm, 0.4 mm, 0.5 mm, 0.6 mm, 0.7 mm, and 0.8 mm as measurement points. By substituting an output value of a distance sensor corresponding to a measurement point into the cubic equation, the constants a, b, c, d, and e are calculated, and the calibration formula into which the constants are substituted is shown on the graph as a function.

As shown in FIG. 6, in the cases of the iron-based alloys, the calibration formulas can be approximated by linear functions. On the other hand, the aluminum alloy is expressed by a quartic function. As described above, a calibration formula shows a trend in order depending on the type of alloy. Therefore, in a case where it is known that a machining target is made of an iron-based material, a calibration formula can be calculated using the following equation in which 0 is substituted in advance for the constants a, b, and c.

$$y=dx+e$$

In the present embodiment, in a case where 0 is substituted in advance for the constants a, b, and c, the number of measurement points where measurement is performed in the output value measurement step can be reduced. Accordingly, a time required for the calibration step can be shortened while maintaining calibration accuracy. On the other hand, in a case where a calibration formula is calculated including the constants a, b, and c, an optimum calibration formula can be calculated with respect to various materials.

Herein, when the workpiece is an iron-based alloy, a case where a measurement time used for calibration is shortened by expressing calibration as a linear function has been described. However, in a case where more precise calibration is to be performed, even when the workpiece is an iron-based alloy, not only the constants d and e but also the constants a, b, and c may be calculated, and the calibration formula which is a quartic function may be acquired.

In the present embodiment, since the eddy current sensors are used as the distance sensors 31 and 32, accurate measurement can be performed even in a case where wet machining is performed. However, in a case where the eddy current sensors are used, since output values of the sensors change depending on a material for a machining target, calibration is necessary. In the present embodiment, since the calibration is performed using a reference machined surface formed by the cutting edge 22, a calibration jig or the like is not necessary. Moreover, since calibration can be performed using an object to be machined, compared to a case where a jig or the like is used, not only a more accurate calibration formula can be calculated, but also a time required for attaching and detaching the jig can be saved.

<Machining Step>

Figure 7A:
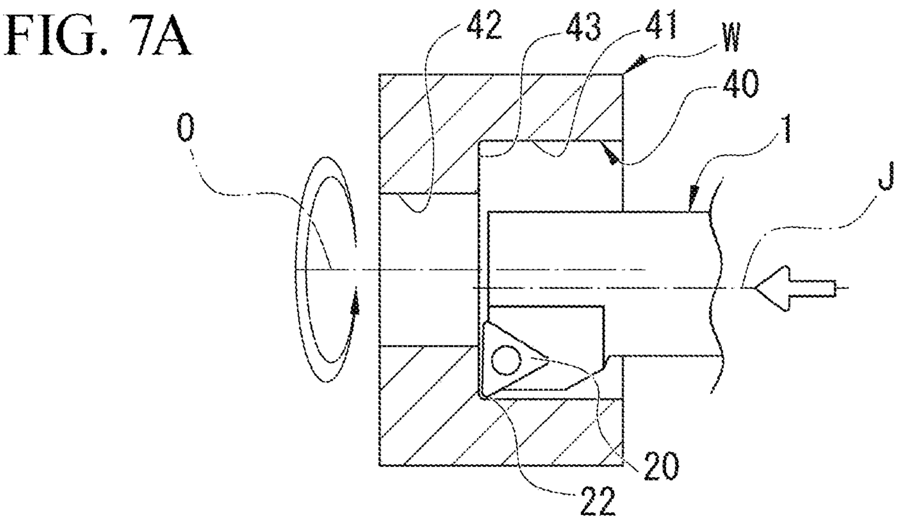
FIG. 7A is a schematic view showing a machining step of the first embodiment.
Figure 7B:
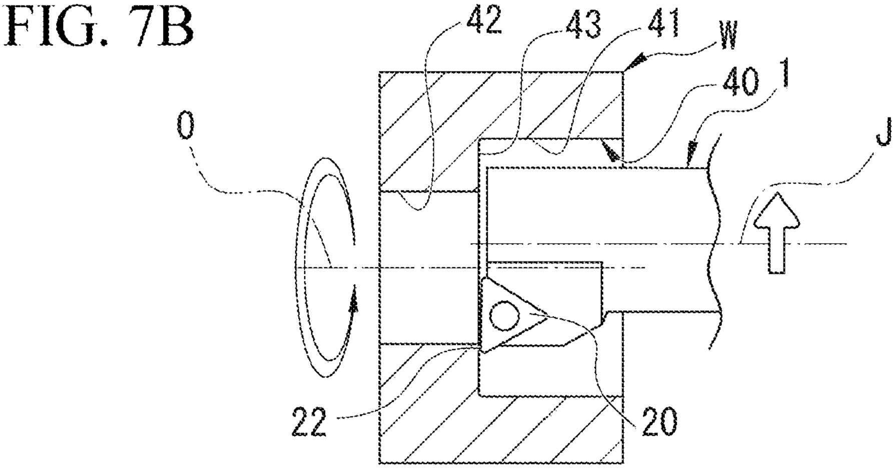
FIG. 7B is a schematic view showing the machining step of the first embodiment.

FIGS. 7A and 7B are schematic views showing the machining step of the present embodiment.

The machining step of the present embodiment is a step of forming a machined surface using cutting edge coordinates. The machining step of the present embodiment has a first turning step and a second turning step.

As shown in FIG. 7A, the first turning step is a step of machining the inner circumferential surface of the larger-diameter part 41. The first turning step is performed while the workpiece W is rotated around the main axis O. In the first turning step, first, in a state where the tool axis J of the turning tool 1 is parallel to the main axis O, a radial outer end of the cutting edge 22 is aligned with a radial target dimension (target position) of the inner circumferential surface of the larger-diameter part 41. Further, the turning tool 1 is moved along an axial tip to bring the cutting edge 22 of the cutting insert 20 into contact with the inner circumferential surface of the larger-diameter part 41. Next, in a state where the cutting edge 22 is in contact with the inner circumferential surface of the larger-diameter part 41, the turning tool 1 is moved to the axial tip. Accordingly, the inner circumferential surface of the larger-diameter part 41 can be subjected to turning machining by the cutting edge 22.

As shown in FIG. 7B, the second turning step is a step of machining the stepped surface 43.

Subsequently to the first turning step, the second turning step is performed while the workpiece W is rotated around the main axis O. In the second turning step, first, an axial forefront of the cutting edge 22 is aligned with an axial target dimension (target position) of the stepped surface 43. Next, in a state where the cutting edge 22 of the cutting insert 20 is in contact with a corner part between the larger-diameter part 41 and the stepped surface 43, the cutting edge 22 of the cutting insert 20 is moved radially inward while a state of being in contact with the stepped surface 43 is maintained. Accordingly, the stepped surface 43 can be subjected to turning machining by the cutting edge 22.

<Measurement Step>

Figure 7C:
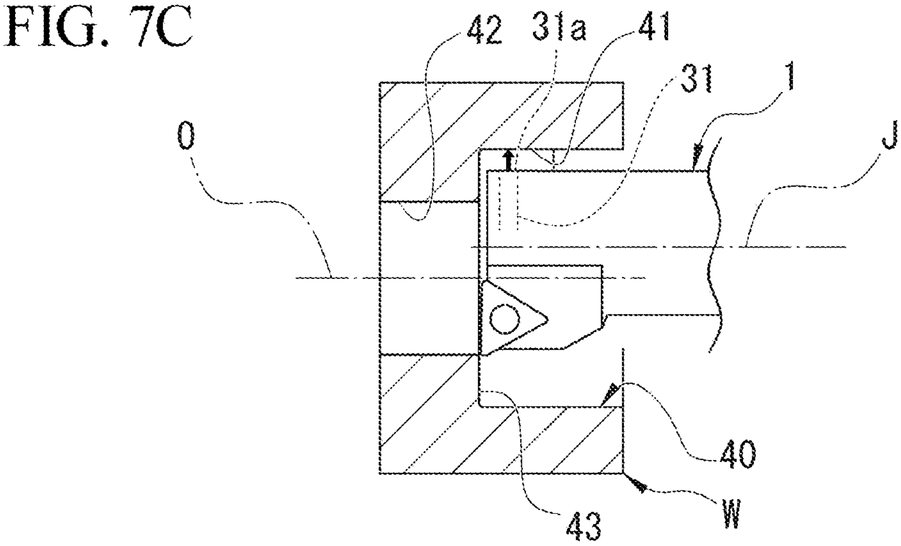
FIG. 7C is a schematic view showing the machining step of the first embodiment.
Figure 7D:
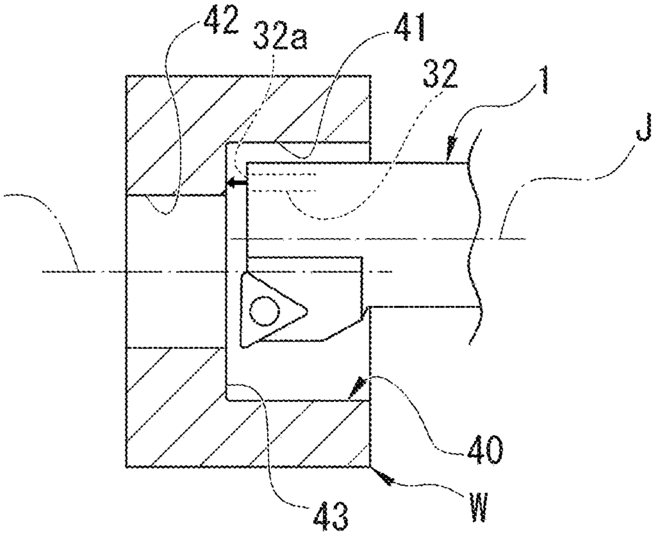
FIG. 7D is a schematic view showing a measurement step of the first embodiment.

FIGS. 7C and 7D are schematic views showing the measurement step of the present embodiment.

The measurement step is a step of performing measurement of a dimension of a machined surface using sensor coordinates. The measurement step has a first measurement step and a second measurement step.

As shown in FIG. 7C, the first measurement step is a step of measuring a dimension of the inner circumferential surface of the larger-diameter part 41 using first sensor coordinates. In the first measurement step, first, the turning tool 1 is moved in the radial direction such that the tip surface 31*a* of the first distance sensor 31 faces the inner circumferential surface of the larger-diameter part 41. Further, by substituting an output value of the first distance sensor 31 into a calibration formula, a dimension of the inner circumferential surface of the larger-diameter part 41 is calculated.

As shown in FIG. 7D, the second measurement step is a step of measuring a dimension of the stepped surface 43 using second sensor coordinates. In the second measurement step, first, the turning tool 1 is moved in the radial direction such that the tip surface 32*a* of the second distance sensor 32 faces the stepped surface 43. Further, by substituting an output value of the second distance sensor 32 into a calibration formula, a dimension of the stepped surface 43 is calculated.

A comparison step is performed after the machining step (first and second turning steps) and the measurement step (first and second measurement steps). In the comparison step, a difference is calculated by comparing a target dimension of a machined surface in the machining step with a dimension of the machined surface measured in the measurement step.

After the comparison step, an additional machining step is performed. In the additional machining step, based on the comparison in the comparison step, in a case where the difference between the target dimension and the measured dimension is greater than a tolerance, it is determined that additional machining is necessary, and the additional machining is performed. That is, a turning method of the present embodiment has the additional machining step of performing additional machining on the workpiece W with the turning tool 1 in accordance with the difference between the target dimension and the measured dimension in the comparison step.

Since the additional machining step is performed through the same procedures as in the machining step shown in FIGS. 7A and 7B, the additional machining step is not shown.

In the present embodiment, dimensional accuracy of the machined surface can be improved by performing the additional machining step by bringing the turning tool closer to the workpiece side from the target position, based on the difference in the comparison step. In addition, the measurement step, which is performed between the machining step and the additional machining step, is performed using the distance sensors 31 and 32 attached to the tool body. For this reason, a tact time from the machining step to the additional machining step can be shortened.

In addition, based on the comparison in the comparison step, in a case where a difference between the target position and a measurement position is greater than a threshold set in advance, it is determined that replacement of the cutting insert 20 is necessary. This is because it is considered that abrasion of the cutting insert 20 is remarkable in a case where the difference between the target dimension and the measured dimension is great.

In the machining method of the present embodiment, the machining step may be performed while a cutting oil or a coolant is supplied to a machined surface. Since the eddy current sensor is used in the measurement step of the present embodiment, accuracy of dimension measurement in the measurement step can be ensured even in a case where wet machining is adopted in the machining step.

Second Embodiment

Figure 8:
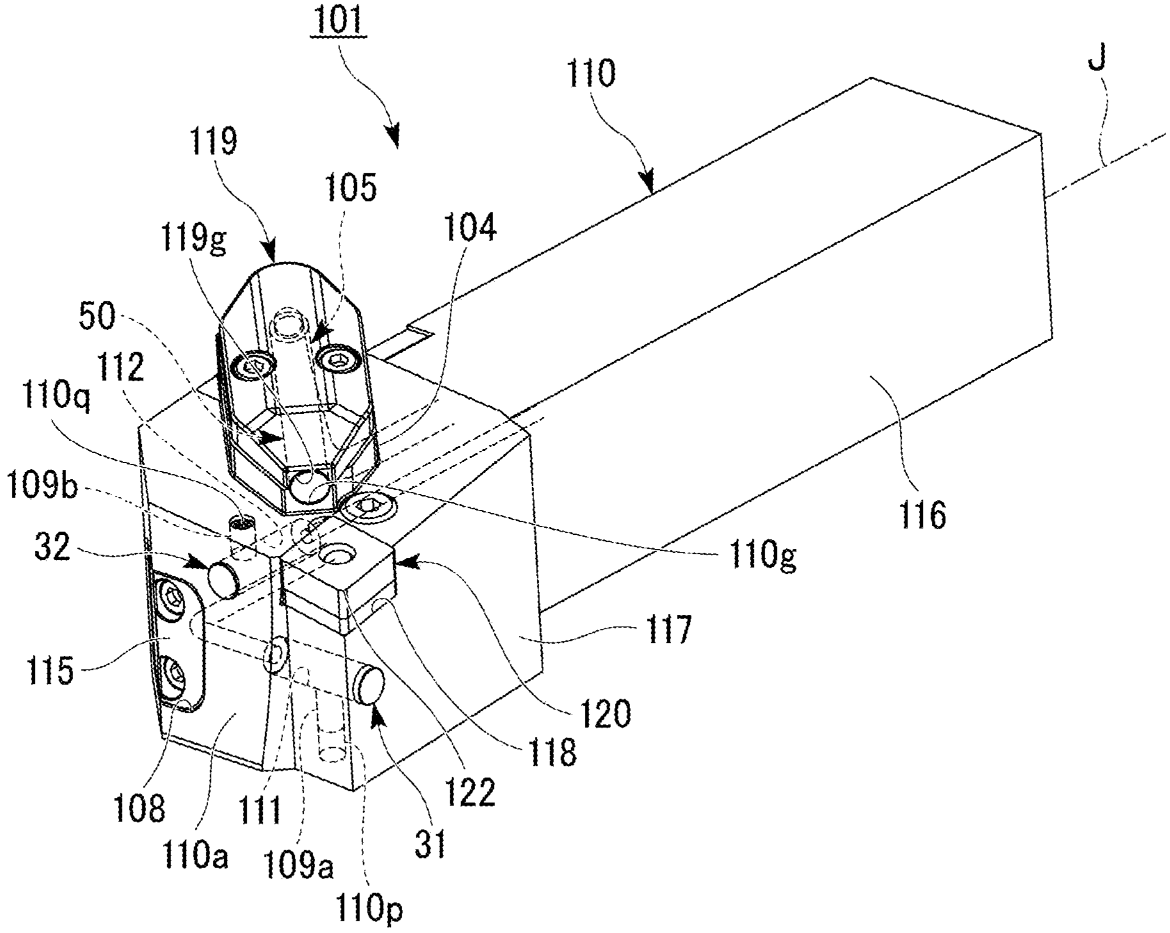
FIG. 8 is a perspective view of a turning tool of a second embodiment.
Figure 9:
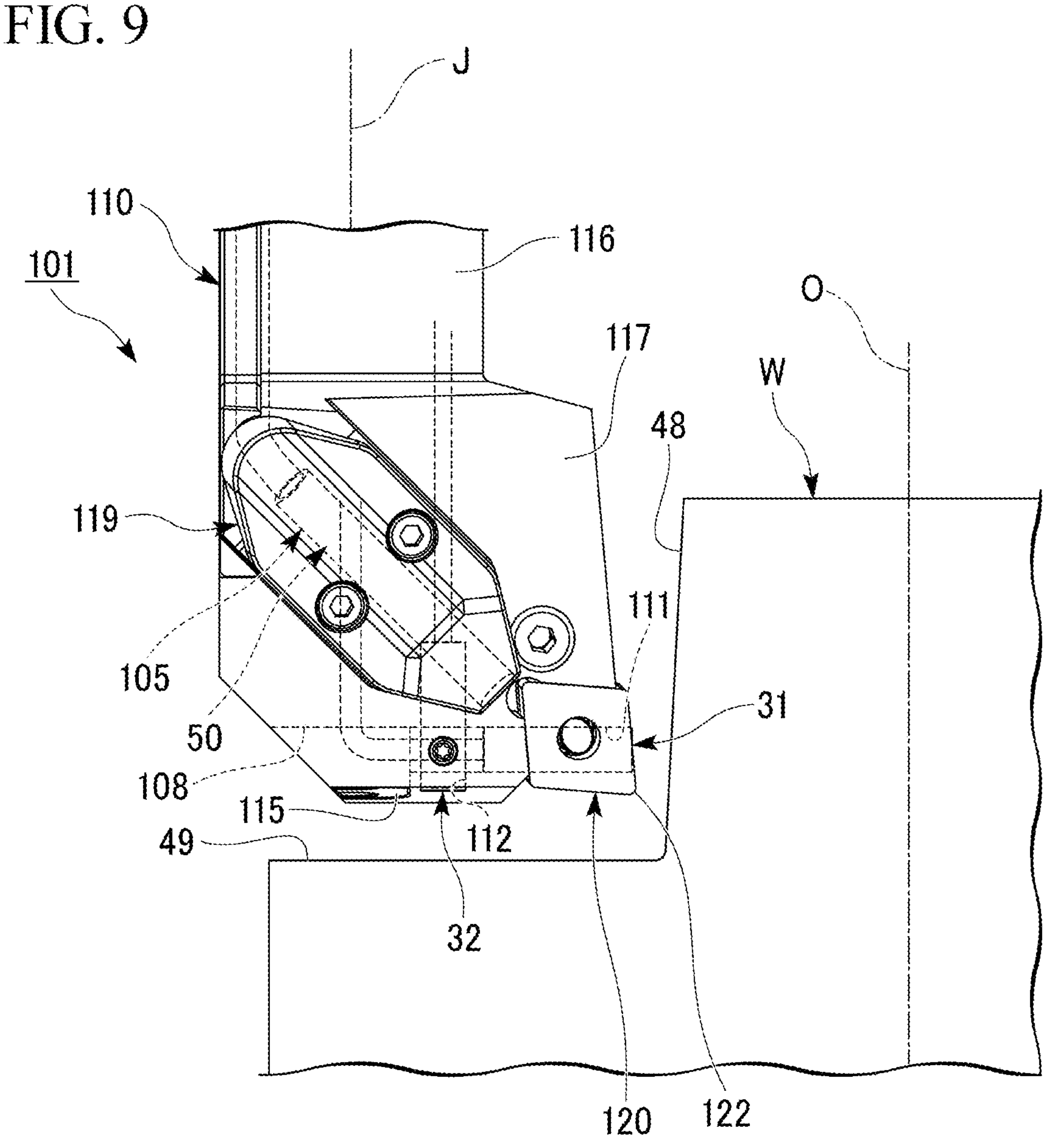
FIG. 9 is a front view of the turning tool of the second embodiment and a part of the workpiece.

FIG. 8 is a perspective view of a turning tool (cutting tool) 101 of the present embodiment. FIG. 9 is a front view of the turning tool 101 and a part of a workpiece.

Components having the same aspects as those in the embodiment described above will be assigned with the same reference signs, and the description thereof will be omitted.

The turning tool 101 of the present embodiment performs turning machining of an outer circumferential surface on a workpiece such as a metal material rotated around a main axis. The turning tool 101 includes a tool body 110, a lid member 115, a bracket 119, a cutting insert 120, the first distance sensor (distance sensor) 31, the second distance sensor (distance sensor) 32, and the imaging device 50.

The tool body 110 extends in a shaft shape along the tool axis J. The tool body 110 has a prismatic shank part 116 around the tool axis J and a protruding part 117 that protrudes from an outer circumferential surface of the shank part 116 at a tip part 110*a* of the tool body 110 to the radially outer side of the tool axis J.

A notch part 108 is provided in the tip part 110*a* of the shank part 116. The notch part 108 opens to a tip side of the tool body 110 and an opposite side to a protruding direction of the protruding part 117. The lid member 115 is inserted and fixed to the notch part 108.

The protruding part 117 is provided with a pedestal 118 to which the cutting insert 120 is attached. The pedestal 118 is located at a corner part on the tip side in the protruding direction of the protruding part 117 and on the tip side of the tool body 110. That is, the tool body 110 has the pedestal 118 at the tip part 110*a*. The cutting insert 120 of the present embodiment has a rhomboid prism shape when viewed from a thickness direction. A cutting edge 122 is provided at a ridge between main surfaces and a side surface of the cutting insert 120.

The first accommodation hole 111 and a second accommodation hole 112 are provided in the tool body 110. The first accommodation hole 111 and the second accommodation hole 112 are circular holes.

The first accommodation hole 111 extends along the radial direction of the tool axis J. One end of the first accommodation hole 111 opens to a tip surface in the protruding direction of the protruding part 117, and the other end opens to the notch part 108. An opening at the other end of the first accommodation hole 111 is covered with the lid member 115. The sensor head 31*b* of the first distance sensor 31 is inserted into the first accommodation hole 111. The first accommodation hole 111 is disposed immediately below the pedestal 118. That is, the first distance sensor 31 is disposed immediately below the cutting insert 120.

The second accommodation hole 112 extends along the axial direction of the tool axis J. One end of the second accommodation hole 112 opens to the tip side of the tool body 110. The sensor head 32*b* of the second distance sensor 32 is inserted into the second accommodation hole 112.

As shown in FIG. 8, a first screw hole 110*p* that extends from the outer circumferential surface to the first accommodation hole 111 and a second screw hole 110*q* that extends from the outer circumferential surface to the first accommodation hole 111 are provided in the tool body 110.

A first set screw 109*a* is inserted into the first screw hole 110*p*. The first distance sensor 31 is pushed against an inner circumferential surface of the first accommodation hole 111 by the first set screw 109*a*. Accordingly, the first distance sensor 31 is fixed to the tool body 110. Similarly, a second set screw 109*b* is inserted into the second screw hole 110*q*. The second distance sensor 32 is pushed against an inner circumferential surface of the second accommodation hole 112 by the second set screw 109*b*. Accordingly, the second distance sensor 32 is fixed to the tool body 110.

As shown in FIG. 9, the turning tool 101 cuts an outer circumferential surface 48 and a stepped surface 49 of the workpiece W that rotates around the rotation axis O. The first distance sensor 31 measures the outer circumferential surface 48 of the workpiece W. On the other hand, the second distance sensor 32 measures the stepped surface 49 of the workpiece W.

In the turning tool 101 of the present embodiment, the first distance sensor 31 is disposed toward the same direction as a protruding direction of the cutting edge 122 with respect to the tool axis J. For this reason, the first distance sensor 31 can measure the outer circumferential surface 48 from the same direction as a direction in which the outer circumferential surface 48 is machined by the cutting edge 122. Therefore, when shifting from the machining step to the measurement step, the outer circumferential surface 48 can be measured without greatly moving the turning tool 101.

A camera pedestal part 104 is provided at an upper surface of the tool body 110. The bracket 119 is fixed to the camera pedestal part 104. A concave groove 110*g* is provided in the camera pedestal part 104. A concave groove 119*g* that overlaps the concave groove 110*g* when viewed from the upper side is provided in a lower surface of the bracket 119. The concave groove 110*g* and the concave groove 119*g* overlap each other and form a circular hole part 105 that extends along the radial direction of the tool axis J. The cutting edge 122 of the cutting insert 120 is disposed on an extension line of the hole part 105. The camera main body part 50*b* of the imaging device 50 is disposed in the hole part 105. That is, the camera main body part 50*b* of the imaging device 50 is sandwiched and held between the camera pedestal part 104 of the tool body 110 and the second bracket 19. The imaging device 50 images the cutting edge 122 and also images a machined surface of a workpiece on which cutting is performed by the cutting edge 122.

Even with the turning tool 101 of a second embodiment with the configuration above, similar to the turning tool 1 of the first embodiment, the cutting method shown in FIGS. 4A to 7D can be performed, and the same effects are obtained.

Although the embodiments of the present invention have been described hereinbefore, each of the configurations and combinations thereof in the embodiments are merely examples, and additions, omissions, substitutions, and other modifications of the configurations can be made without departing from the concept of the present invention. In addition, the present invention is not limited to the embodiments.

INDUSTRIAL APPLICABILITY

In the present invention, since the accuracy of dimension measurement can be improved in the cutting method using the cutting tool that has the distance sensor, industrial use is possible.

REFERENCE SIGNS LIST

1: Cutting tool (turning tool)
6: Contact sensor
10, 110: Tool body
22, 122: Cutting edge
31: First distance sensor (distance sensor)
32: Second distance sensor (distance sensor)
A, B: Measuring instrument

What is claimed is:

1. A cutting method that is a machining method using a tool body to which a distance sensor is attached, the cutting method comprising:

a coordinate setting step of setting each of a cutting edge coordinate with a point of a cutting edge provided at the tool body as reference and a sensor coordinate with a reference point of the distance sensor as reference;

a machining step of forming a machined surface using the cutting edge coordinate; and a measurement step of measuring a dimension of the machined surface using the sensor coordinate, and wherein the distance sensor is an eddy current sensor, the cutting method further comprises a calibration step of calibrating the eddy current sensor, the calibration step includes:

a reference value measurement step of performing dimension measurement of a reference machined surface, which is machined by the cutting edge, using a measuring instrument, an output value measurement step of measuring a plurality of measurement points where a distance from the reference machined surface is changed using the distance sensor with the sensor coordinate as reference and storing an output value of the distance sensor corresponding to each of the measurement points, and a calculation step of calculating a calibration formula representing a relationship between a distance to the reference machined surface in each of the measurement points and the output value, and in the measurement step, the dimension of the machined surface is calculated by substituting the output value of the distance sensor into the calibration formula.

2. The cutting method according to claim 1, further comprising:

a comparison step of calculating a difference by comparing a target dimension of the machined surface in the machining step with a measured dimension measured in the measurement step; and an additional machining step of performing additional machining of the machined surface in accordance with the difference.

3. The cutting method according to claim 1, wherein a plurality of the distance sensors having different measurement directions are attached to the tool body, and the sensor coordinate is set for each of the distance sensors in the coordinate setting step.

4. The cutting method according to claim 1, wherein the coordinate setting step is performed by bringing the point of the cutting edge and a tip surface of the distance sensor in contact with each other using a contact sensor.

5. The cutting method according to claim 1, wherein in a case where x is the output value of the distance sensor, y is the distance to the machined surface, and a, b, c, d, and e are constants, the calibration formula is expressed by the following equation $$y=ax^4+bx^3+cx^2+dx+e.$$

6. The cutting method according to claim 5, wherein in the calculation step, in a case where a material for a machining target is an iron-based material, 0 is substituted in advance for the constants a, b, and c.

7. The cutting method according to claim 1, wherein the tool body is provided with a communication unit that transmits measurement data measured by the distance sensor to an external control device, and the control device performs the calculation step and stores the calculated calibration formula.

8. The cutting method according to claim 1, wherein the machining step is performed while a cutting oil or a coolant is supplied to the machined surface.

* * * * *